(12) United States Patent
Schaerges

(10) Patent No.: US 11,182,176 B2
(45) Date of Patent: Nov. 23, 2021

(54) CONTEXTUAL DEEP EXPANSION IN USER-INTERFACE TREES

(71) Applicant: SAP SE, Walldorf (DE)

(72) Inventor: Hans-Peter Schaerges, Mannheim (DE)

(73) Assignee: SAP SE, Walldorf (DE)

(*) Notice: Subject to any disclaimer, the term of this patent is extended or adjusted under 35 U.S.C. 154(b) by 2 days.

(21) Appl. No.: 16/689,315

(22) Filed: Nov. 20, 2019

(65) Prior Publication Data
US 2021/0149691 A1 May 20, 2021

(51) Int. Cl.
*G06F 9/451* (2018.01)
*G06F 16/9038* (2019.01)
*G06F 16/901* (2019.01)

(52) U.S. Cl.
CPC .......... *G06F 9/451* (2018.02); *G06F 16/9027* (2019.01); *G06F 16/9038* (2019.01)

(58) Field of Classification Search
CPC .. G06F 16/904; G06F 16/2246; G06F 16/322; G06F 9/451; G06F 16/9038; G06F 16/9027
USPC ....................................................... 715/829
See application file for complete search history.

(56) References Cited

U.S. PATENT DOCUMENTS

| | | | | |
|---|---|---|---|---|
| 8,732,597 B2* | 5/2014 | Ludoph | ............... | G06F 3/0481 715/764 |
| 2005/0132304 A1* | 6/2005 | Guido | ................... | G06F 16/904 715/853 |
| 2005/0198582 A1* | 9/2005 | Hennum | ............. | G06F 3/04842 715/772 |

* cited by examiner

*Primary Examiner* — Sherrod L Keaton
(74) *Attorney, Agent, or Firm* — Sterne, Kessler, Goldstein & Fox P.L.L.C.

(57) ABSTRACT

Disclosed herein are computer-implemented method, system, and computer-program product (computer-readable storage medium) embodiments for contextual deep expansion in user-interface trees. An embodiment includes configuring at least one computer processor to perform operations that include accessing, in a hierarchical data structure, a first-level data structure including a first group of one or more first-level elements, and a second-level data structure including second group of one or more second-level elements, and a third-level data structure including third group of one or more third-level elements. An embodiment may further include operations of presenting, via an interface, a handle corresponding to at least the third group and the given second-level element, in response to a first input event configured to expand the first-level data structure, and deeply expanding a presentation of the hierarchical data structure, in response to the second input, to show at least some elements of the first, second, and third groups.

14 Claims, 10 Drawing Sheets

500

| Node | Edit Qualifier | Key Information | Expression Type |
|---|---|---|---|
| ∨ Entity Types | | | |
| ∨ SEPMRA_C_PD_ProductType | | | |
| ∨ Deep Expand (6 more nodes on 2 levels) | | Source: annotati... | |
| ∨ UI.LineItem#ab | | | |
| > UI.DataField | | Label: Axd; Valu... | |
| | | | |
| | | | |

| Node | Field0 | Field1 | Field2 |
|---|---|---|---|
| ∨ Branch0 | | | |
| ∨ SubBranch0 | | | |
| ∨ SubSubBranch0 | | | |
| > SubSubSubBranch0 | | | |
| > SubSubSubBranch1 | | | |
| > SubSubSubBranch2 | | | |
| SSB0Leaf0 | | | |
| SSB0Leaf1 | | | |
| > SubSubBranch1 | | | |
| > SubSubBranch2 | | | |
| > SubBranch1 | | | |
| > Branch1 | | | |

FIG. 2

| | | 300 |
|---|---|---|
| ⌄SEPMRA_C_PD_ProductType | | |
| ⌄ Local Annotations | | Source: annotati... |
| > ≫ UI.LineItem#ab | 📄 | |
| >    UI.FilterFacets | 📄 | |
| >    UI.QuickViewFacets | 📄 | |
| >    UI.Facets | 📄 | |
| > ≫ UI.LineItem | 📄 | |
| > External Annotations | | Source:SEPMR... |
| > External Annotations | | Source:mainSer... |
| | | |
| | | |

| Node | Edit Qualifier | Key Information | Expression Type |
|---|---|---|---|
| ∨ Entity Types | | | |
| ∨ SEPMRA_C_PD_ProductType | | | |
| ∨ Deep Expand | | Source: annotati... | |
| ∨ UI.LineItem#ab | 🖊 | | |
|     > UI.DataField | | Label: Axd; Valu... | |
|     UI.TextArrangement | 🖊 | | EnumMember ∨ |
|     UI.Importance | 🖊 | | EnumMember ∨ |
| > UI.FilterFacets | 🖊 | | |
| > UI.QuickViewFacets | 🖊 | | |
| > UI.Facets | 🖊 | | |
| > UI.LineItem | 🖊 | | |
| > External Annotations | | Source:SEPMR... | |
| > External Annotations | | Source:mainSer... | |

| Node | Edit Qualifier | Key Information | Expression Type | Value | Action |
|---|---|---|---|---|---|
| ∨ Entity Types | | | | | |
| SEPMRA_C_PD_ProductType | | | | | |
| ⇘ Deep Expand ▽tions | | Source: annotati... | | | + 🗑 |
| ∨ UI.LineItem#ab | 🖉 | | | | + 🗑 |
| > UI.DataField | | Label: Axd; Valu... | | | + 🗑 |
| UI.TextArrangement | 🖉 | | EnumMember ▽ | Enter a... ▽ | + 🗑 |
| UI.Importance | 🖉 | | EnumMember ▽ | High ▽ | + 🗑 |
| > UI.FilterFacets | 🖉 | | | | + 🗑 |
| > UI.QuickViewFacets | 🖉 | | | | + 🗑 |
| > UI.Facets | 🖉 | | | | + 🗑 |
| > UI.LineItem | | Source:SEPMR... | | | 🗑 |
| > External Annotations | | Source:mainSer... | | | |
| > External Annotations | | | | | |

FIG. 6

| Node | Edit Qualifier | Key Information | Expression Type |
|---|---|---|---|
| ∨ Entity Types | | | |
| ∨ SEPMRA_C_PD_ProductType | | | |
| ∨ Local Annotations | | Source: annotati... | |
| ∨ UI.LineItem#ab | | | |
| ∨ UI.DataField | | Label: Axd; Valu... | |
| *Value | | | Int |
| ∨ Label | | | String (i18n) |
| UI.MultiLineText | | | Bool |
| Criticality | | | Path |
| CriticalityRepresentation | | | EnumMember |
| IconUrl | | | String |
| UI.TextArrangement | | | EnumMember |
| UI.Importance | | | EnumMember |
| > UI.FilterFacets | | | |
| > UI.QuickViewFacets | | | |
| > UI.Facets | | | |
| > UI.LineItem | | | |
| > External Annotations | | Source:SEPMR... | |
| > External Annotations | | Source:mainSer... | |

FIG. 7

| Node | Edit Qualifier | Key Information | Expression Type |
|---|---|---|---|
| ∨ Entity Types | | | |
| ∨ SEPMRA_C_PD_ProductType | | | |
| ∨ Local Annotations | | Source: annotati... | |
| ⩔ Next Level Expand | | Source: annotati... | |
| ∨ UI.DataField | | Label: Axd; Valu... | |
| *Value | | | Int |
| ∨ Label | | | String (i18n) |
| UI.MultiLineText | | | |
| Criticality | | | Path |
| CriticalityRepresentation | | | EnumMember |
| IconUrl | | | String |
| UI.TextArrangement | 🖉 | | EnumMember |
| UI.Importance | 🖉 | | EnumMember |
| > UI.FilterFacets | 🖉 | | |
| > UI.QuickViewFacets | 🖉 | | |
| > UI.Facets | 🖉 | | |
| > UI.LineItem | | | |
| > External Annotations | | Source:SEPMR... | |
| > External Annotations | | Source:mainSer... | |

FIG. 8

CONTEXTUAL DEEP EXPANSION IN USER-INTERFACE TREES

BACKGROUND

In applications having user interfaces that display tree-style hierarchical listings, traditional expand/collapse actions may be provided, for example, via keystroke(s) for a selected node (element) or via a graphical handle corresponding to a given node or element that may be selected and/or expanded via an event at the handle. In response to an event that triggers expansion, changing the visual state of the corresponding tree in the user interface (UI) may be cumbersome and computationally costly. Such burdens may arise at least in use cases where the tree is large and/or deep beyond certain computational thresholds for a given implementation, adversely affecting performance and user experience.

Conventional methods avoid computational burden and unexpected delays by implementing expansion (also known as an "expand" action) to open only the next level in the hierarchy below the according node shown in the UI tree. In other words, previous trees aiming for reasonable performance would only implement expansion in a single expansion (single-level expansion, or "single expand") action. If a user wishes to perform a further expansion, the user may need to move focus of the UI to another handle (e.g., via an input device) and repeat the single expand action as before.

Depending on UI, data model, and retrieval (e.g., lazy loading, eager loading, etc.), the refresh of the tree state and its rendering after an expand action may be time-consuming and may delay or interfere with the user's interaction with a given application via the UI. While search and/or filter mechanisms may be able to work around some of the obstacles that user may face, such mechanisms also defeat the purpose of browsing deep trees expanded in depth, at least because searching and/or filtering tend to result in reduced context of the tree. Search and filter mechanisms may also fail to reduce computational complexity and overhead, as they may still need to traverse entire trees.

BRIEF DESCRIPTION OF THE DRAWINGS

The accompanying drawings are incorporated herein and form a part of the specification.

FIG. 2 depicts a tree representation of a generic hierarchical data structure, according to some embodiments.

FIG. 3 depicts explicit handles for single-level expansion and deep expansion, according to some embodiments.

FIG. 4 depicts a contextual deep-expansion handle as an implicit popover emerging as a result of an event at a single-level expansion handle, according to some embodiments.

FIG. 6 depicts a presentation of part of a hierarchical data structure before a deep expansion is performed, according to some embodiments.

FIG. 7 depicts a presentation of part of a hierarchical data structure after having performed a deep expansion, according to some embodiments.

FIG. 8 depicts a next-level expansion handle, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
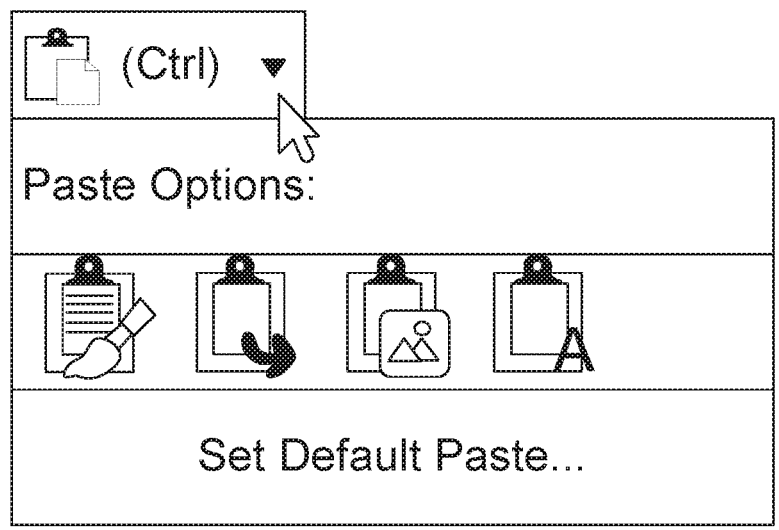
FIG. 1 depicts a graphical paradigm of delayed options, according to an embodiment.

Provided herein are system, apparatus, device, method and/or computer program product embodiments, and/or combinations and sub-combinations thereof, for contextual deep expansion in user-interface trees.

According to the enhanced techniques disclosed herein, a user who has some knowledge of the underlying tree structure may be given an opportunity to reduce or eliminate repetitive calls of single-level expansions by providing some additional actions to achieve more power and versatility. The enhanced techniques disclosed herein (as well as other techniques that will be apparent to persons skilled in the relevant art(s) based on the teachings provided herein) may be implemented without spoiling existing paradigms for changing the tree's visual state and without sacrificing performance or compromising user experience.

Benefits may be seen in applications for browsing outlines, annotations, software development project workspaces, repositories, file systems, directory listings, or other data structures that may involve hierarchical data structures, to name a few non-limiting examples. More specifically, performance of these applications may be drastically improved for hierarchical data structures that are relatively deep (e.g., more than four levels, or more than ten levels) and/or relatively large (e.g., hundreds of thousands of nodes, or orders of magnitude greater) with respect to computer platforms expected to process the hierarchical data structures, according to some embodiments. In this detailed description, with respect to hierarchical data structures, the terms "node" and "element" may be used interchangeably.

A user may desire an unobtrusive control to accelerate the access to the deeper levels of a hierarchical data structure, which may be represented as a tree, in some embodiments. After the user has expanded a given branch, a deep-expansion system, method, or other embodiment, may contextually provide the user with an opportunity to expand this branch further with a single, neighboring action instead of performing several single-level expand actions from different, moving positions in a viewport of the hierarchical data structure.

In a user-interface context of a tree node that has been recently expanded by a single-level expansion, an alternative or additional option may be presented to the user to have this expanded node further expanded to deeper hierarchical levels as available. This expansion may be done by a full expand of this node in one action or by a series of repetitive actions to expand one more level. The type and extent of the actions may depend on a given use case. Nodes may be expanded until the last level of this sub-tree is reached, in some embodiments, or alternatively, until a predetermined threshold is reached.

This functionality may be provided as a graphical or textual popover object, in some embodiments. Additionally, or alternatively, this functionality may be provided via row-dependent toolbar buttons (e.g., in a toolbar above the tree representation) or as an item in a context menu of the according node, but they have disadvantages: A toolbar button may be visually far from the point of interest, which may require a deliberate check for the state of the toolbar button with any node selection, whether or not the user intends to expand deeper.

Thus, a removed toolbar button may require the user to look for and select a toolbar to be aware of the option, and to exercise the option, of deep expansion. This toolbar interface style may fit within certain workflows, but may impose difficulties on other workflows. On the other hand, a popover element, near to or overlaying an existing contextual element, may serve both to alert the user that a deep-expansion option is available, and to allow the user ready access to exercise the deep-expansion option, without requiring any digression from the existing workflow in a given user interface.

FIG. 1 depicts a graphical paradigm of delayed options, according to an embodiment.

While FIG. 1 may not directly relate to node-based deep expansion, e.g., on tree nodes or similar hierarchical data structures, the GUI object depicted in FIG. 1 shows an example of a context-sensitive popover, similar to an automatic context menu that may appear with a paste operation in certain office productivity suites, including MICROSOFT OFFICE. The paradigm involves delayed options, which may not appear normally except in certain contexts of pasting, for example.

Moreover, the context menu may appear at the site of the pasted text, reducing any necessary travel of a pointing device to access the context menu, for example. After a "Paste"-action, a contextual menu appears to select a more "precise" manner of pasting. In the case of pasted text, as shown in FIG. 1, context menus may detract from user experience, as the presented options may be seldom desired and/or may overlap parts of the document. Considerations from design and implementation of context menus such as those shown in FIG. 1 may further inform development of smarter context menus, such as may be used to navigate and expand hierarchical data structures multiple levels at a time.

FIG. 2 depicts a tree representation of a generic hierarchical data structure, according to some embodiments.

FIG. 2 depicts a generic hierarchical data structure, which may itself be a branch node in a higher level of hierarchical data structure. Using known terminology to describe hierarchical data structures or tree representations, a tree may represent a hierarchical data structure that includes any number of branches or leaves (leaf nodes). Branches themselves may contain any number of sub-branches or their own leaves, through any level of depth in a given hierarchical data structure. A view may be collapsed by default, showing only the highest level(s) of branches, or only the tree itself, in some embodiments, as a single element (node), for example. Expansion of collapsed branches may take place one hierarchical level at a time (single-level expansion), branch by branch, according to some embodiments. However, deep expansion may accelerate how branches, sub-branches, and hierarchical levels are expanded and presented, for example. Any specific use cases may also be contemplated within the generic framework presented in FIG. 2 and as described herein.

The circled area of FIG. 2 depicts a selection of a given node for expansion. As shown, the arrow-like object under the cursor depicts an expansion handle in the form of a single-level expansion handle. The elements in the data structure shown in FIG. 2 are example annotations for modeling, according to some embodiments.

At this stage, the user may have no indication of what may be in the selected node beforehand—the selected node may contain a flat group of elements all of the same level below the selected node, or may contain several additional hierarchical layers, for example. However, the underlying system may be able to determine that there this collapsed branch has multiple layers below, and may thus be configurable to indicate the depth or size, as well as directly present an option for a deep-expand operation. One such example may be seen in FIG. 3, as described further below.

FIG. 3 depicts explicit handles for single-level expansion and deep expansion, according to some embodiments.

In such embodiments, where possible to perform deep expansion in a given tree or sub-tree, the deep-expansion option may be presented via the user interface whenever the given tree or sub-tree is presented. In the case of a GUI, the deep-expansion option may take the form of a double chevron or nested arrow signifying a deep-expansion handle in the GUI, as shown in FIG. 3. Using this approach of constantly showing the deep-expansion in elements where users may exercise a deep-expansion option, users may thus always be made aware of the option for applicable elements displayed in the GUI, for example, in line with each applicable element.

This approach may differ from expected appearance of trees, readjusting some users' workflows. As a potential drawback to this approach, usability of a GUI may be made more complicated by adding another small-sized click target, e.g., deep-expansion handle next to single-level expansion handle, possibly among other GUI handles in close proximity. Depending on the size and type of display for the GUI (e.g., low resolution and/or small size, touchscreen, etc.), such a configuration may require users to decide their options in advance and to be haptically precise, which may degrade usability, especially for handheld devices, for example.

In the example of FIG. 3, and subsequent examples of FIGS. 4-8, a specific example is shown with a hierarchical representation of modeling UI annotations. However, other use cases for hierarchical data structures may be envisaged, including custom data structures in various languages for programming or markup, directory listings in file systems or other hierarchical databases, outlines, organization charts, and so on, to name a few non-limiting examples according to some embodiments.

FIG. 4 depicts a contextual deep-expansion handle as an implicit popover emerging as a result of an event at a single-level expansion handle, according to some embodiments.

The expanded branch may contain at least one node that is not a leaf, and thus which may be further expandable. Accordingly, an option may be provided to have a recursive expansion or deep expansion of a given node that is expandable by more than one level, if desired by the user. In a case of a GUI, the option may be presented in the form of a lightweight popover object. In some embodiments, the popover may be displayed in response to triggering of a UI event, such as a keystroke and/or a click, tap, or gesture in a predetermined area of a display or interaction with a handle, for example.

Depending on a configuration for representing the deep-expand option (e.g., "icon only," "text only," "icon+text," etc.), the popover may be displayed in a different location from (e.g., "above" or "left of") the clicked handle without overlapping relevant information displayed, in some embodiments, and without requiring a long "mouse-way" to invoke the deep-expand action.

As shown by the long arrow superimposed on FIG. 4, where a user of a GUI has selected a single-level expansion handle using a cursor or pointer (shown as a hand-shaped cursor next to the superimposed long arrow), a "Deep Expand" handle may be presented as a popover object, popping up over the displayed tree representation. For example, the popover may appear near the selected single-level expansion handle, in some embodiments.

The popover element may fully or partially conceal other text or object(s) displayed in the UI. In some embodiments, popover objects may be configured to avoid concealing other text or objects, or to reduce a likelihood or amount of such concealment to an extent possible within predetermined tolerances, for example. While the deep-expansion option is presented, e.g., via a handle such as the "Deep Expand" handle depicted in FIG. 4, a user may click, tap, gesture, hover, or otherwise shift focus to select the deep-expansion handle to actuate a deep-expansion operation. Other keystrokes, gestures, or commands may also be used to actuate a deep-expansion operation while the deep-expansion option is presented, according to some embodiments.

Figure 5:
FIG. 5 depicts a popover including additional information about a hierarchical data structure as a preview of the deep-expansion action, according to some embodiments.

FIG. 5 depicts a popover including additional information about a hierarchical data structure as a preview of the deep-expansion action, according to some embodiments.

Thus, in addition to a deep-expansion handle such as that shown in FIG. 4, in some embodiments, depending on factors such as a given use case and/or any data that may already be loaded in a memory, for example, a presentation of the deep-expand handle may be supplemented with additional information regarding an amount of data (e.g., number of elements, levels of depth, etc.) that may be expanded as a result of the deep-expansion. Presentation of large numbers or warnings of expansion operations requiring considerable time or resources may cause the user to think twice whether this action should actually be performed. In some embodiments, the additional information may include other metrics or indicia (numerical, textual, graphical, etc.) to show a user what may be required of a deep-expansion operation for a given element or group of elements, for example.

FIG. 6 depicts a presentation of part of a hierarchical data structure before a deep expansion is performed, while a deep-expansion handle is being presented, according to some embodiments.

As shown in FIG. 6, a deep-expansion handle is presented in a popover object, and a user has moved a cursor into a position to select the deep-expansion handle in the popover object. For illustrative purposes, a box with a dotted line is drawn over a selected element (in the embodiment depicted, having a label "UI.LineItem#ab") and an element above the selected element. As shown in FIG. 6, a popover object (depicted with a thicker line, in the example shown) appears over the element above the selected element, overlapping any existing text in the element above the selected element. A user may then move a cursor to select the popover element, as shown by the pointer-style cursor depicted in FIG. 6.

In some embodiments, while the deep-expansion handle is presented in a popover object, doing any other action (selecting another row etc.) or entering unrelated keystrokes or commands may cause the popover to disappear, hiding the functionality and possibly removing the deep-expand option for the selected element. Some embodiments may configure the deep-expansion option to appear temporarily, only as a direct consequence of the previous single-level expansion action for a given branch, for example.

FIG. 7 depicts a presentation of part of a hierarchical data structure after having performed a deep expansion, according to some embodiments.

Here, the deep-expansion handle of FIG. was triggered by a selection event in a UI. As a result, shown in FIG. 7, the popover object may disappear or become hidden. Also as a result, the previously selected node may now be deeply expanded. While the tree representation depicted in FIG. 7 only shows one branch one level below the deep expansion, FIG. 7 is simplified for illustrative purposes only.

Real-world examples of deep expansion may include any number of elements or levels of depth, for example, including millions of nodes in hierarchies over ten levels deep, according to some embodiments. The arrows superimposed on FIG. 7 show some sub-branches expanded as a result of the deep-expansion action triggered by actuation of the handle presented in FIG. 6 above. In some embodiments, selected groups or subgroups of sub-branches in a deep-expansion operations may be subject to or exempt from expansion by deep-expansion operations, as further described herein.

FIG. 8 depicts a next-level expansion handle, according to some embodiments.

In some embodiments where single-level or deep-expansion actions may be implemented as repetitive action for subsequent-level expansion, a handle for "Next Level" or "One More Level" may be displayed in a remaining popover that would still be visible after an expansion action is performed. However, this next-level expansion action for a branch may be displayed but with input disabled once the last level of a branch has been expanded, in order to avoid an erroneous, unwanted click on an overlapping part of a UI, reducing a likelihood of potentially undesired effects. Replacing a deep-expansion option with next-level expansion as in FIG. 8 may thus improve usability of some users' workflows, according to some embodiments.

Figure 9:
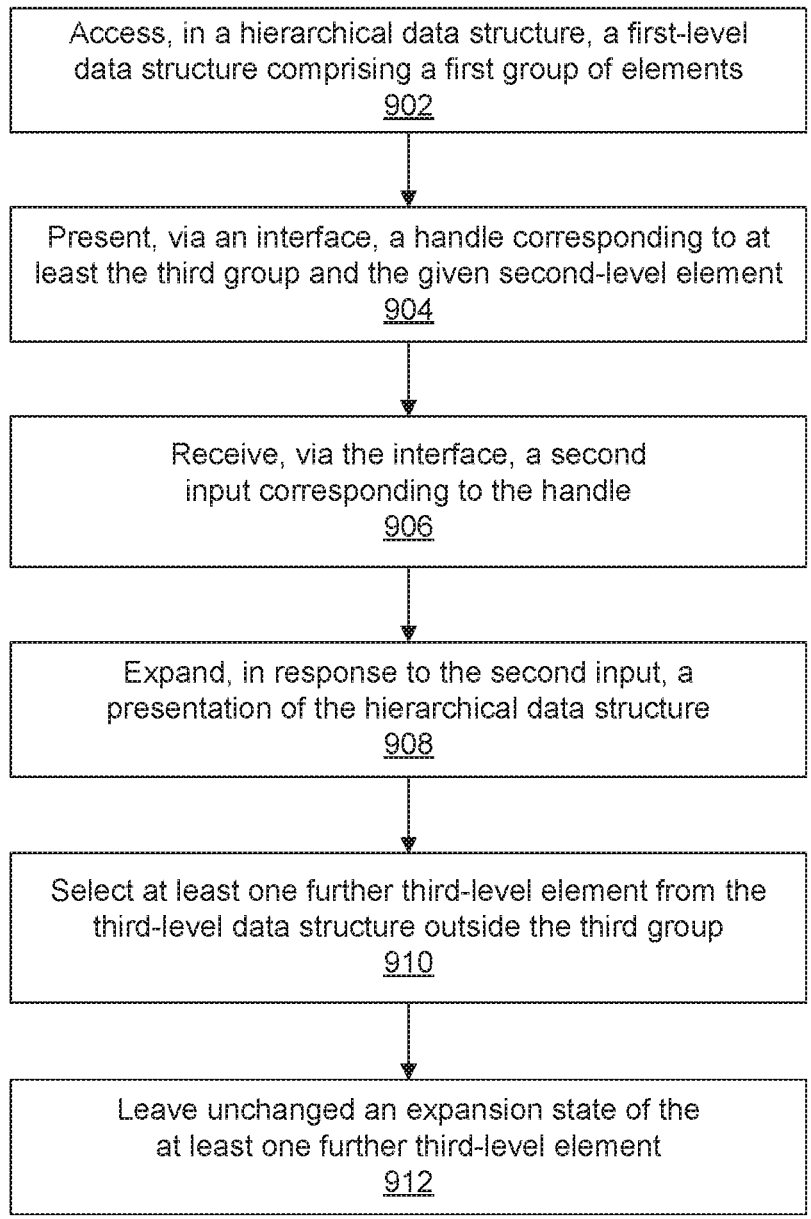
FIG. 9 is a flowchart illustrating a process implementing some of the enhanced techniques described herein, according to some embodiments.

FIG. 9 shows an example method 900 for image conversion and reorientation with selection of regions of interest, according to some embodiments. Method 900 may be performed by processing logic that may comprise hardware (e.g., circuitry, dedicated logic, programmable logic, microcode, etc.), software (e.g., instructions executing on a processing device), or a combination thereof.

Method 900 shall be described with reference to FIGS. 2-10. However, method 900 is not limited only to those example embodiments. The steps of method 900 may be performed by at least one computer processor coupled to at least one memory device. An example processor and memory device(s) are described below with respect to 1004 of FIG. 10. In some embodiments, method 900 may be performed using computer system 1000 of FIG. 10, which may further include at least one processor and memory such as those of FIG. 10.

In 902, at least one processor 1004 may access, in a hierarchical data structure, a first-level data structure comprising a first group of elements, according to some embodiments. As described, a hierarchical data structure may be a particular data structure configured to include multiple levels of elements in a hierarchy of levels, for example; levels may be embodied in data structures within, or referenced from within, other data structures.

Examples of a hierarchical data structure may include, without limitation, outlines, annotations, software development project workspaces, repositories, file systems, directory listings, etc. Of these, an illustrative example may be a directory listing in the context of a file system. A root directory may be considered as a zeroth-level data structure.

The root directory may contain various files and directories, elements which may be considered first-level data structures. The directories in the root directory are thus first-level data structures that may contain next-level or subsequent-level elements—for example, the directories may contain their own files and sub-directories as second-level elements, and the sub-directories may contain sub-sub-directories containing third-level elements, and so on. Designations of first level, zeroth level, etc. may be relative and arbitrary; levels may include negative or fractional numbers, in some embodiments, for purposes of assigning order in a hierarchy.

Thus, as a generalized form of the above example, a first group of elements may include one or more first-level elements, and a second-level data structure comprising a second group of elements, which may include one or more second-level elements, and a third-level data structure comprising a third group of elements, which may include one or more third-level elements, etc. A given third-level element of the one or more third-level elements may correspond to a given second-level element of the one or more second-level elements, demonstrating a relationship of containing, e.g., where the given third-level element is contained in the given second-level element, such as a third-level file in the second-level sub-directory as described in the example of a file system directory listing noted above.

A relationship of "containing" may not require bodily incorporation of data structures, but may instead be satisfied by reference, links, pointers to addresses of data structures higher, lower, or parallel in the hierarchy of a hierarchical data structure, for example. Some embodiments may configure database tables, markup files, or various definitions of data-structure types in various levels of abstraction, to be hierarchical data structures as described herein; the enhanced techniques disclosed herein may thus facilitate rendering, processing, and interacting with such data structures via various user interface (UI) paradigms to access a data structure as in 902.

UI input may be interactive or non-interactive (e.g., repeated via a script or macro), and may include use of a command-line interface (CLI), a terminal, textual, or text-based user interface (TUI), audible voice commands, an external device such as via a serial interface (e.g., RS-232, USB, IEEE 1149, IEEE 1394, PCIe, DisplayPort, etc.), or through a separate application programming interface (API). Input may be effected via a graphical user interface (GUI) or other UI, such as using a position and movement or gestures, such as of a pointing device, which may include a hardware mouse, joystick, pointing stick, pressure sensor, trackball, touchpad, or other motion-tracking device as understood in the art. UI events may include keystroke(s) for a selected node (e.g., via GUI or TUI), or via a graphical handle corresponding to a given node that may be selected and/or expanded via an event at the handle (e.g., via pointing device, touch screen, motion sensor, etc.).

Accessing as performed in 902 may be part of an iterative process, according to some embodiments, either performed entirely in 902 or split into multiple stages, some of which may be performed in 902 and in other parts of method 900. For example, the entirety of a top-level (or other given-level) data structure may be pre-loaded on a client device in order to perform accesses of 902 for purposes of deep expansion, for example. In some embodiments, data structures as accessed may be partially loaded onto a client device sufficiently to allow some capability of browsing loaded data structures, e.g., via accessing as in 902, with further parts incrementally loaded onto the client device, such as automatically in the background, or in response to at least one expand action, which may be triggered by at least one UI event.

In 904, processor 1004 may present, via an interface (e.g., any type of UI or API, as described above), a handle corresponding to at least the third group and the given second-level element, in response to a first input event configured to expand the first-level data structure. To present a handle, processor may perform an action or sequence of actions to enable keybindings, display or otherwise render a graphical object, for example, a floating virtual button, drop-down menu, expansion hook, other similar handle, or any combination thereof, to name a few non-limiting examples. Refer to FIGS. 3-6 and 8 for some non-limiting examples including a double chevron or nested arrow, which may appear on a display, with respect to an existing element, in a different location of the display (e.g., elsewhere, or next to an existing GUI element, such as for single-level expansion), or in the same location of the display (e.g., overlapping, transforming, replacing, appearing in lieu of, another GUI element, such as for a single-level expansion). Other interfaces may provide, e.g., at least one text menu, audible notification, or voice prompt indicating an available option for deep expansion, in some embodiments.

Further, in 904, the first input event may refer to a selection of a given element in the hierarchical data structure. In some embodiments, the given element may be a first-level element that contains next-level or subsequent-level elements several levels deep, e.g., a directory containing at least one sub-directory containing at least one sub-sub-directory, e.g., of a file system directory listing. According to some embodiments, "next level" and "subsequent level" may refer to the same relative advance in hierarchical levels and may be used interchangeably. Further benefits may be realized for deep trees having, e.g., four to ten or more levels of hierarchical elements, with total element numbers in the hundreds of thousands, millions, or orders of magnitude greater, in some embodiments.

Selection may involve, to list a few non-limiting examples: clicking (a mouse or equivalent) or tapping (a touchscreen or equivalent), on a given element and/or an expansion handle corresponding to the given element, if such an expansion handle is presented in a GUI; pressing a corresponding key (on a keyboard or equivalent) if a given keybinding is available; issuing a voice command in response to a voice prompt to select a given element or expansion; or any combination thereof.

Further to the above description, one non-limiting example of selection may involve GUI interaction, in which a single-level expansion handle is presented for a selected element, which may be a first-level element containing second-level element that contains a third-level element; a first input event may then be received in the form of a click on the single-level expansion handle; and, in response to the click on the single-level expansion handle, the single-level expansion may be performed by processor 1004. At about the same time as the single-level expansion is performed, processor 1004 may also present, via the GUI, a new expansion handle, in response to processor 1004 having detected that the selected first-level element contains at least a second-level element that contains at least a third-level element.

The expansion handle presented in this way (e.g., as in 904) may be a deep expansion handle, in some embodiments (e.g., FIGS. 3-6). The expansion handle presented in this way (e.g., as in 904) may be a next-level expansion handle, in some embodiments (e.g., FIG. 8). Additionally, according to some embodiments, the type of handle presented in 904 may be determined conditionally, e.g., in response to a number of levels of depth, which may correspond to the hierarchical data structure as a whole, or to the elements directly under the selected element, for example, among other possible factors.

Some embodiments may include a numerical index (or other textual indicator or graphical indicia) of a level of depth in the hierarchical data structure, that would be expanded to such level if the handle presented in 904 were selected. Such indicia may be displayed as a popover, in some embodiments, which may overlay text on top of existing text or other presented graphical or textual graphical or textual objects, at least temporarily. Further indicia presented with the handle may include a warning or time estimate for completing expansion (e.g., "deep expand"; "deep expand (may take several seconds to display)"; "deep expand: this sub-tree contains 8 more levels and 600,000 more elements below—proceed?", etc.), within the scope of expansion corresponding to the deep-expansion handle presented in 904. As described elsewhere herein, deep expansion may not necessarily expand all levels or elements, according to some embodiments.

In 906, processor 1004 may receive, via the interface, a second input corresponding to the handle. The second input may resemble the first input, but may be directed to the handle presented in 904 rather than any other previously available handle or selection. Additionally, or alternatively, the second input may be by different means from the first input (e.g., mouse rather than keyboard, or vice-versa, or any other combination of input methods); for example, the second input may be a gesture distinct from any gesture that may have constituted the first input. More specifically, in an example where the first input is a click on a single-level expansion handle, the second input may be a mouse hover or long press on a deep-expansion handle in a popover object. In some embodiments, the second input may result in a prompt, a warning, a numerical index, or similar output, if not already presented in 904. This additional output in response to the second input may be used, e.g., to obtain confirmation from a user that the user is requesting a potentially time-consuming or resource-intensive operation.

In 908, processor 1004 may expand, in response to the second input, a presentation of the hierarchical data structure. For example, the second input may be a UI event corresponding to the input received in 906, as described above. In some embodiments, the presentation may include an expanded view of the given first-level element and at least a subgroup of the second group. Additionally, in some embodiments, the subgroup comprises at least some of the one or more second-level elements and the third group. Using the example of a file system directory listing showing at least one first-level element accessed in 902, with a handle presented in 904, where, in response to the second input of 906, processor 1004 in 908 may expand the existing presentation in the user interface to include not only second-level elements in the second group, but also third-level elements in the third group, expanding more deeply than only the second level as the next level from the first.

In some embodiments, the same deep expansion operation may expand subsequent levels of the hierarchical data structure, if such subsequent levels are present. For example, if any of the third-level elements in the third group contains at least one fourth-level element, e.g., in a fourth group of elements, the same deep expansion operation that expands the second and third groups may also expand the fourth group, revealing the fourth-level elements therein. The deep expansion operation may automatically repeat itself, iteratively, recursively, or a combination thereof, for a fifth group of fifth-level elements, a sixth group of sixth-level elements, and so on as present, until a deepest level of the hierarchical data structure is expanded, or until a predetermined depth threshold is reached.

In some embodiments, a depth threshold may be configured (e.g., hard-coded by an implementer, or specified by a user or administrator before or during runtime of an application supporting deep-expansion functionality), which may serve as a predetermined depth threshold for deep expansion, for example, to expand four levels of hierarchy at a time. Additionally or alternatively, deep expansion may be configured to expand a certain number of elements at a time. Such predetermined thresholds, e.g., of depth and/or quantity of elements, may be configured in order to avoid overloading or crashing a given application or system, according to some embodiments.

For next-level expansions (e.g., per FIG. 8) or for deep expansions that may be limited by predetermined thresholds, e.g., of depth and/or quantity of elements), subsequent-level data structures or elements in the hierarchical data structure may be expanded in response to a subsequent input event (e.g., a further instance of 906, resulting in a further instance of 908, in some embodiments). Other handles may be presented for purposes of next-level expansions, and/or other input events may be accepted to trigger next-level expansions, for example.

In 910, processor 1004 may select at least one further third-level element from the third-level data structure outside the third group, according to some embodiments. For example, without 910, deep expand may expand to deeper and deepest levels not only of a particular branch of a tree, but also of multiple branches of a tree, or all branches of a tree, in some embodiments. Thus, if a second group contains third-level elements, whether or not all third-level elements are in an arbitrarily defined third group, third-level elements may be expanded more deeply (e.g., down to included fourth-, fifth-, and subsequent-level elements) including for third-level elements not within the third group of third-level elements. In some embodiments, a deep expansion may expand an entire tree representation of a hierarchical data structure, for example.

With 910, in some embodiments, some elements may be optionally selected for exemption from deep expansion, as discussed further below with respect to 912. Selection of 910 may be automatic, such as via an application of predetermined criteria, which may be configurable by implementers, administrators, and/or users. For example, subsequent-level hierarchical data structures within the hierarchical data structure (e.g., branches of a tree) may be designated as potentially too burdensome for deep expansion by default (e.g., by a preemptive sanity check to avoid expanding branches having more than a billion elements) or otherwise not of interest to a user (e.g., branches selected or by a user to be skipped by deep expansion; alternatively this selection action may appear as de-selection for deep expansion).

In 912, processor 1004 may leave unchanged an expansion state of the at least one further third-level element, according to some embodiments. For example, certain branches of a tree representation of a hierarchical data structure (e.g., sub-directories or directories, in some use cases) selected per 910 may be left unchanged, while other branches (possibly all other branches, in some embodiments) may be deeply expanded per 908. In some embodiments, 912 may be performed by not performing 908 with respect to some elements or branches of a hierarchical data structure, for example.

Examples of how processor 1004 may perform any operations or steps of method 900 are described further above, such as with respect to FIGS. 2-8.

Any or all of the above steps may be performed as part of embodiments as shown and described further above with respect to FIG. 2-8, in some embodiments. Additionally or alternatively, any or all of the above steps may be performed as part of processing demonstrated in FIGS. 9 and/or 10, for example.

Not all steps of process 900 may be needed in all cases to perform the enhanced techniques disclosed herein. Further, some steps of process 900 may be performed simultaneously, or in a different order from that shown in FIG. 9, as will be understood by a person of ordinary skill in the art.

Figure 10:
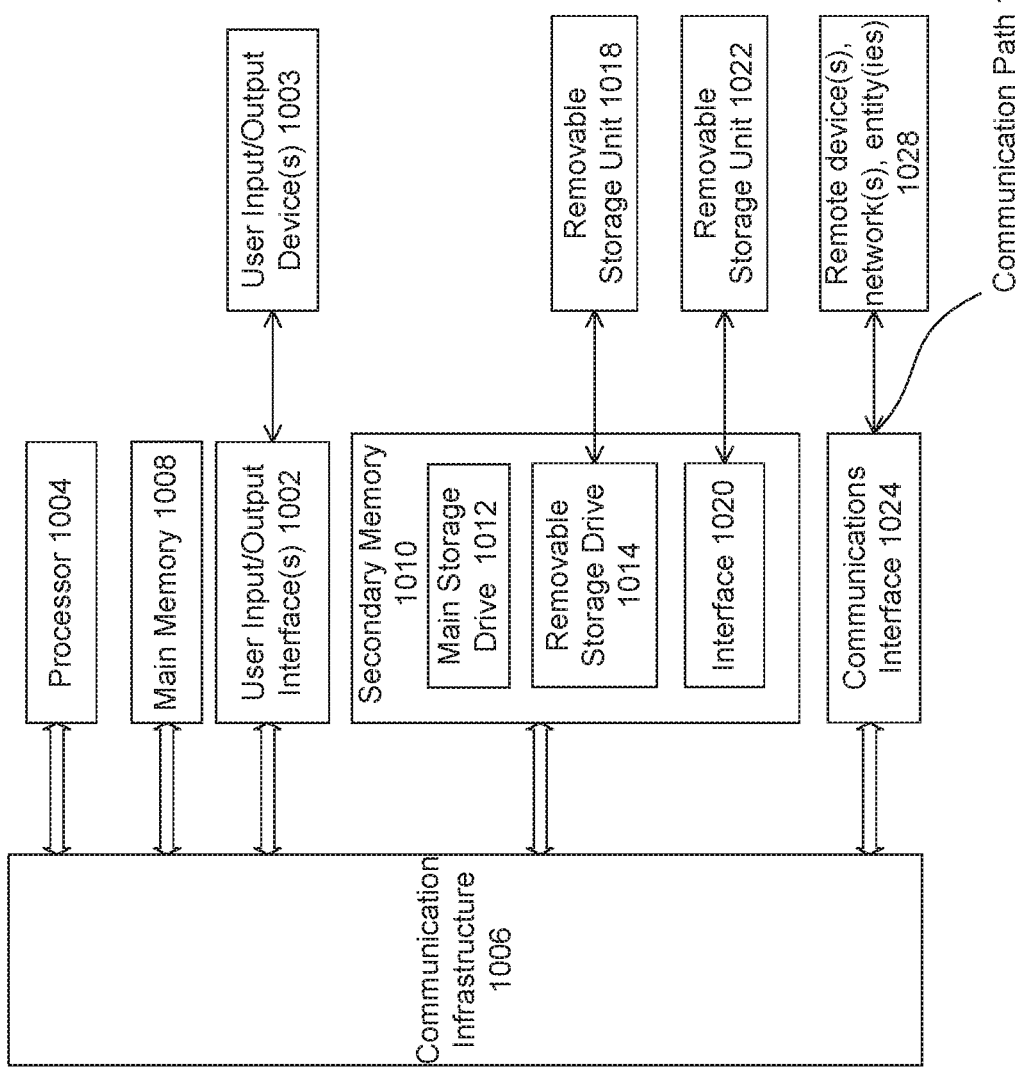
FIG. 10 is a block diagram of an example computer system useful for implementing various embodiments.

Various embodiments may be implemented, for example, using one or more well-known computer systems, such as computer system 1000 shown in FIG. 10. One or more computer systems 1000 may be used, for example, to implement any of the embodiments discussed herein, as well as combinations and sub-combinations thereof.

Computer system 1000 may include one or more processors (also called central processing units, or CPUs), such as a processor 1004. Processor 1004 may be connected to a bus or communication infrastructure 1006.

Computer system 1000 may also include user input/output device(s) 1003, such as monitors, keyboards, pointing devices, etc., which may communicate with communication infrastructure 1006 through user input/output interface(s) 1002.

One or more of processors 1004 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 may also include a main or primary memory 1008, such as random access memory (RAM). Main memory 1008 may include one or more levels of cache. Main memory 1008 may have stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 may include a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 may read from and/or write to removable storage unit 1018.

Secondary memory 1010 may include other means, devices, components, instrumentalities or other approaches for allowing computer programs and/or other instructions and/or data to be accessed by computer system 1000. Such means, devices, components, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 may enable computer system 1000 to communicate and interact with any combination of external devices, external networks, external entities, etc. (individually and collectively referenced by reference number 1028). For example, communication interface 1024 may allow computer system 1000 to communicate with external or remote devices 1028 over communications path 1026, which may be wired and/or wireless (or a combination thereof), and which may include any combination of LANs, WANs, the Internet, etc. Control logic and/or data may be transmitted to and from computer system 1000 via communication path 1026.

Computer system 1000 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1000 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1000 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments may operate with software, hardware, and/or operating system implementations other than those described herein.

It is to be appreciated that the Detailed Description section, and not any other section, is intended to be used to interpret the claims. Other sections may set forth one or more but not all example embodiments as contemplated by the inventor(s), and thus, are not intended to limit this disclosure or the appended claims in any way.

While this disclosure describes example embodiments for example fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," "some embodiments," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described example embodiments, but should be defined only in accordance with the following claims and their equivalents.

What is claimed is:

1. A computer-implemented method, comprising:
   accessing, by at least one computer processor, in a hierarchical data structure, a first-level data structure comprising a first group of elements,
   wherein the first group of elements comprises:
      one or more first-level elements, and
      a second-level data structure comprising a second group of elements,
   wherein the second group of elements comprises:
      one or more second-level elements, and
      a third-level data structure comprising a third group of elements,
   wherein the third group of elements comprises one or more third-level elements,
   wherein a given third-level element of the one or more third-level elements corresponds to a given second-level element of the one or more second-level elements, and
   wherein the given second-level element of the one or more second-level elements corresponds to a given first-level element of the one or more first-level elements;
   in response to a first input event configured to expand the first-level data structure, presenting, by the at least one computer processor, via an interface, a handle corresponding to at least the third group and the given second-level element, wherein the handle comprises a deep-expansion handle, and wherein the deep-expansion handle appears in a same location of a display, of the interface, where a single-level expansion handle has been present;
   presenting, by the at least one computer processor, via the interface, a numerical index of a level of depth of the hierarchical data structure to be expanded;
   presenting, by the at least one computer processor, a time estimate for completing a deep expansion associated with the deep-expansion handle;
   receiving, by the at least one computer processor, via the interface, a second input selecting the handle;
   and expanding, by the at least one computer processor, in response to the second input, a presentation of the hierarchical data structure, wherein the presentation comprises an expanded view of the given first-level element and multiple elements, but less than all elements, of the one or more second-level elements and the third group, within a predetermined threshold.

2. The computer-implemented method of claim 1, wherein the expanding further comprises:
   selecting, by the at least one computer processor, at least one further third-level element from the third-level data structure outside the third group; and
   leaving unchanged, by the at least one computer processor, an expansion state of the at least one further third-level element.

3. The computer-implemented method of claim 1, wherein the deep-expansion handle overlaps the single-level expansion handle in response to the first input event.

4. The computer-implemented method of claim 1, wherein the single-level expansion handle is configured to expand a subsequent-level data structure in the hierarchical data structure, in response to a subsequent input event.

5. The computer-implemented method of claim 1, further comprising, by the at least one computer processor in response to the second input, expanding a further presentation of the hierarchical data structure, wherein the further presentation comprises a further expanded view of the second-level data structure, a further expanded view of the third-level data structure, and at least one fourth-level data structure.

6. A system, comprising:
   a memory; and at least one computer processor communicatively coupled with the memory and configured to perform operations comprising:

accessing, in a hierarchical data structure, a first-level data structure comprising a first group of elements, wherein the first group of elements comprises:
- one or more first-level elements, and
- a second-level data structure comprising a second group of elements,
- wherein the second group of elements comprises:
  - one or more second-level elements, and
  - a third-level data structure comprising a third group of elements,
- wherein the third group of elements comprises one or more third-level elements,
- wherein a given third-level element of the one or more third-level elements corresponds to a given second-level element of the one or more second-level elements, and
- wherein the given second-level element of the one or more second-level elements corresponds to a given first-level element of the one or more first-level elements;

in response to a first input event configured to expand the first-level data structure, presenting, via an interface, a handle corresponding to at least the third group and the given second-level element, wherein the handle comprises a deep-expansion handle, and wherein the deep-expansion handle appears in a same location of a display, of the interface, where a single-level expansion handle has been present;

presenting, via the interface, a numerical index of a level of depth of the hierarchical data structure to be expanded;

presenting, by the at least one computer processor, a time estimate for completing a deep expansion associated with the deep-expansion handle;

receiving, via the interface, a second input selecting the handle; and expanding, in response to the second input, a presentation of the hierarchical data structure, wherein the presentation comprises an expanded view of the given first-level element and multiple elements, but less than all elements, of the one or more second-level elements and the third group, within a predetermined threshold.

7. The system of claim 6, wherein the expanding operation further comprises operations of:
selecting at least one further third-level element from the third-level data structure outside the third group; and
leaving unchanged an expansion state of the at least one further third-level element.

8. The system of claim 6, wherein the single-level expansion handle is configured to expand a subsequent-level data structure in the hierarchical data structure, in response to a subsequent input event.

9. The system of claim 6, the operations further comprising, in response to the second input, expanding a further presentation of the hierarchical data structure, wherein the further presentation comprises a further expanded view of the second-level data structure, a further expanded view of the third-level data structure, and at least one fourth-level data structure.

10. A non-transitory computer-readable storage medium having instructions stored thereon, wherein the instructions, when executed by at least one computer processor, cause the at least one computer processor to perform operations comprising:

accessing, in a hierarchical data structure, a first-level data structure comprising a first group of elements, wherein the first group of elements comprises:
- one or more first-level elements, and
- a second-level data structure comprising a second group of elements,
- wherein the second group of elements comprises:
  - one or more second-level elements, and
  - a third-level data structure comprising a third group of elements,
- wherein the third group of elements comprises one or more third-level elements,
- wherein a given third-level element of the one or more third-level elements corresponds to a given second-level element of the one or more second-level elements, and
- wherein the given second-level element of the one or more second-level elements corresponds to a given first-level element of the one or more first-level elements;

in response to a first input event configured to expand the first-level data structure, presenting, via an interface, a handle corresponding to at least the third group and the given second level element, wherein the handle comprises a deep-expansion handle, and wherein the deep-expansion handle appears in a same location of a display, of the interface, where a single-level expansion handle has been present;

presenting, via the interface, a numerical index of a level of depth of the hierarchical data structure to be expanded;

presenting, by the at least one computer processor, a time estimate for completing a deep expansion associated with the deep-expansion handle;

receiving, via the interface, a second input selecting the handle; and expanding, in response to the second input, a presentation of the hierarchical data structure, wherein the presentation comprises an expanded view of the given first-level element and multiple elements, but less than all elements, of the one or more second-level elements and the third group, within a predetermined threshold.

11. The non-transitory computer-readable storage medium of claim 10, wherein the expanding operation further comprises operations of:
selecting at least one further third-level element from the third-level data structure outside the third group; and
leaving unchanged an expansion state of the at least one further third-level element.

12. The non-transitory computer-readable storage medium of claim 10, wherein the deep-expansion handle overlaps the single-level expansion handle in response to the first input event.

13. The non-transitory computer-readable storage medium of claim 10, wherein the single-level expansion handle is configured to expand a subsequent-level data structure in the hierarchical data structure, in response to a subsequent input event.

14. The non-transitory computer-readable storage medium of claim 10, the operations further comprising, in response to the second input, expanding a further presentation of the hierarchical data structure, wherein the further presentation comprises a further expanded view of the second-level data structure, a further expanded view of the third-level data structure, and at least one fourth-level data structure.

* * * * *